(12) United States Patent
Hsieh et al.

(10) Patent No.: US 8,003,887 B1
(45) Date of Patent: Aug. 23, 2011

(54) CONNECTING MEMBER

(75) Inventors: Chung-Cheng Hsieh, Taipei Hsien (TW); Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/910,678

(22) Filed: Oct. 22, 2010

(30) Foreign Application Priority Data

Jul. 9, 2010 (CN) .......................... 2010 1 0222385

(51) Int. Cl.
*H01R 12/00* (2006.01)
(52) U.S. Cl. .......................................................... 174/69
(58) Field of Classification Search .................. 439/67, 439/493, 74, 65, 66; 174/117 F, 721 R, 69
See application file for complete search history.

(56) References Cited

U.S. PATENT DOCUMENTS

| | | | | |
|---|---|---|---|---|
| 3,296,365 A * | 1/1967 | Basile | ..................... | 174/117 FF |
| 3,300,572 A * | 1/1967 | Dahlgren et al. | ............... | 174/69 |
| 4,065,199 A * | 12/1977 | Andre et al. | .................. | 439/498 |
| 4,155,613 A * | 5/1979 | Brandeau | ......................... | 439/90 |
| 5,259,792 A * | 11/1993 | Beck et al. | ................ | 439/607.49 |
| 5,274,195 A * | 12/1993 | Murphy et al. | ......... | 174/117 FF |
| 6,017,222 A * | 1/2000 | Kao | ................................ | 439/67 |
| 6,646,207 B1 * | 11/2003 | Featherstone, III | ........ | 174/117 F |
| 7,140,910 B1 * | 11/2006 | Liao | ............................. | 439/502 |
| 2008/0057778 A1 * | 3/2008 | Clark et al. | .................... | 439/502 |
| 2008/0233794 A1 * | 9/2008 | Clark et al. | .................... | 439/502 |
| 2009/0095114 A1 * | 4/2009 | Ridgway et al. | ................ | 74/493 |
| 2010/0248530 A1 * | 9/2010 | Clark et al. | .................... | 439/470 |

* cited by examiner

*Primary Examiner* — Neil Abrams
*Assistant Examiner* — Phuong Nguyen
(74) *Attorney, Agent, or Firm* — D. Austin Bonderer

(57) ABSTRACT

A connecting member includes a cable configured for transmitting signals, a first resilient component located on a top surface of the cable, and a second resilient component located on a bottom surface of the cable, configured for being secured to the first resilient component. The cable includes a first connector and a second connector, that are configured to be electrically connected to two electronic components. The cable is sandwiched between the first resilient component and the second resilient component; and the first and second resilient components are elastically deformable between a first state, in which the first and second resilient components are contracted, and a second state, in which the first and second resilient components are elastically extended.

14 Claims, 3 Drawing Sheets

CONNECTING MEMBER

CROSS-REFERENCE TO RELATED APPLICATIONS

This application is related to co-pending applications entitled, "CONNECTING MEMBER", filed on Sep. 15, 2010, application Ser. No. 12/882,602.

BACKGROUND

1. Technical Field

The present disclosure relates to a connecting member for connecting two electronic components together.

2. Description of Related Art

Generally, a cable is configured for connecting electronic components together, such as a hard disk drive and an optical disk drive to a motherboard. The cable normally has a surplus portion when connected to the electronic components in order to allow for different distances between each component. The surplus portion of the cable takes up a lot of space between the electronic components and is usually disorderly placed in the electronic device.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
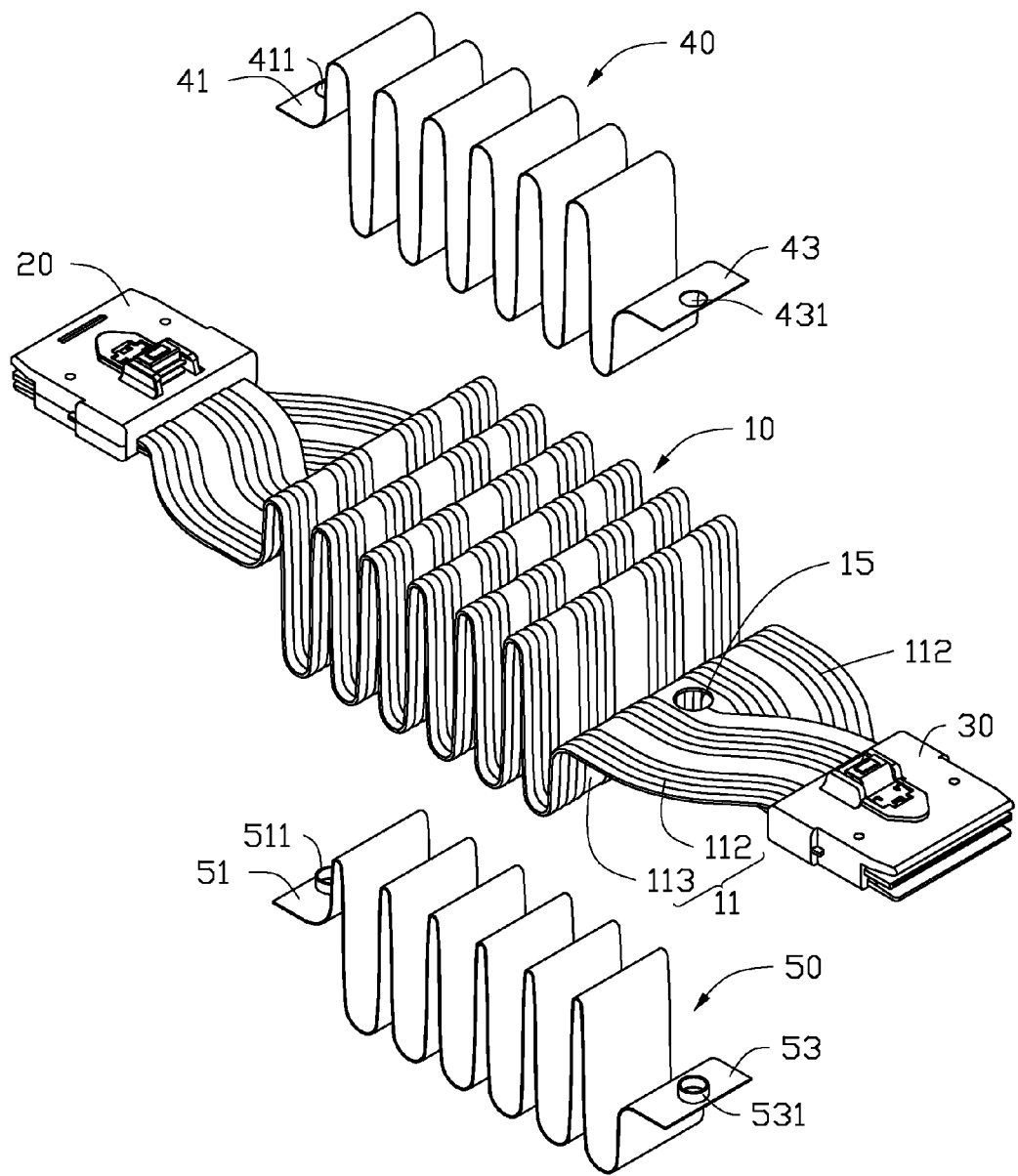
FIG. 1 is a partially exploded, isometric view of a connecting member in accordance with an embodiment.

Referring to FIG. 1, a connecting member in accordance with an exemplary embodiment includes a cable 10, a first resilient component 40, and a second resilient component 50.

The cable 10 connects two electronic components of an electronic device (not shown) together signal transmission between the two electronic components. The cable 10 includes a cable body 11, a first connector 20, and a second connector 30. The first and second connectors 20, 30 are secured to the two ends of the cable body 11 respectively. In one embodiment, the electronic device can be a computer or a server, etc.; the electronic component can be a storage device, or a motherboard, etc.; and the cable 10 can be a ribbon cable. The cable body 11 includes a top surface 112 and a bottom surface 113 opposite to the top surface 112, and two through holes 15 are defined in the cable body 11.

The first resilient component 40 is capable of being located on the top surface 112 of the cable body 11, and includes a first and a second end 41, 43. A securing hole 411 is defined in the first end 41, and a securing hole 431 is defined in the second end 43. In one embodiment, the first resilient component 40 is an extendable elastic piece that has a wave shape when contracted. In one embodiment, the width of the first resilient component 40 is less than, or equal to, the width of the cable body 11.

The second resilient component 50 is capable of being located on the bottom surface 113 of the cable body 11 and includes a first and a second end 51, 53. A positioning post 511 is located on the first end 51, and a positioning post 531 is located on the second end 53. The positioning posts 511, 531 are configured for extending through the two through holes 15 of the cable body 11, to be inserted into the securing holes 411, 431. In one embodiment, the second resilient component 50 is an extendable elastic piece, that has a wave shape when contracted. The second resilient component 50 is similar to the first resilient component 40, for example, in length and width. In another embodiment, the width and the length of the first and second resilient components 40, 50 can be adjusted according to the width and length of the cable body 11.

Figure 2:
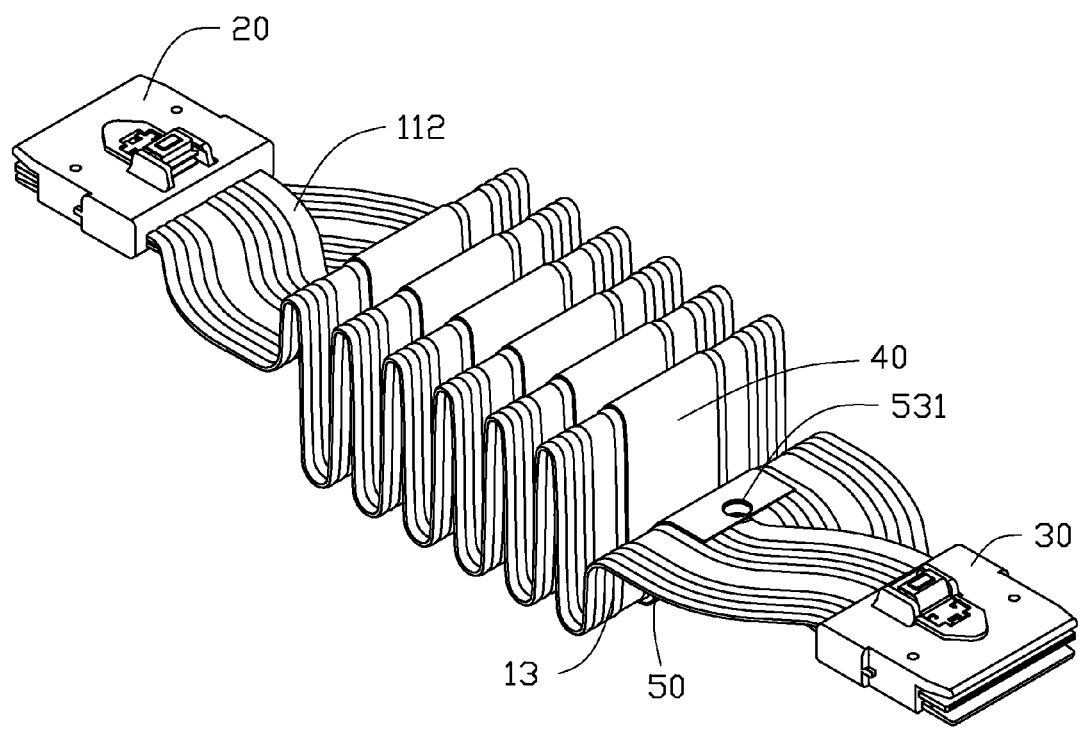
FIG. 2 is an assembled view of FIG. 1, showing the connecting member in a first state.
Figure 3:
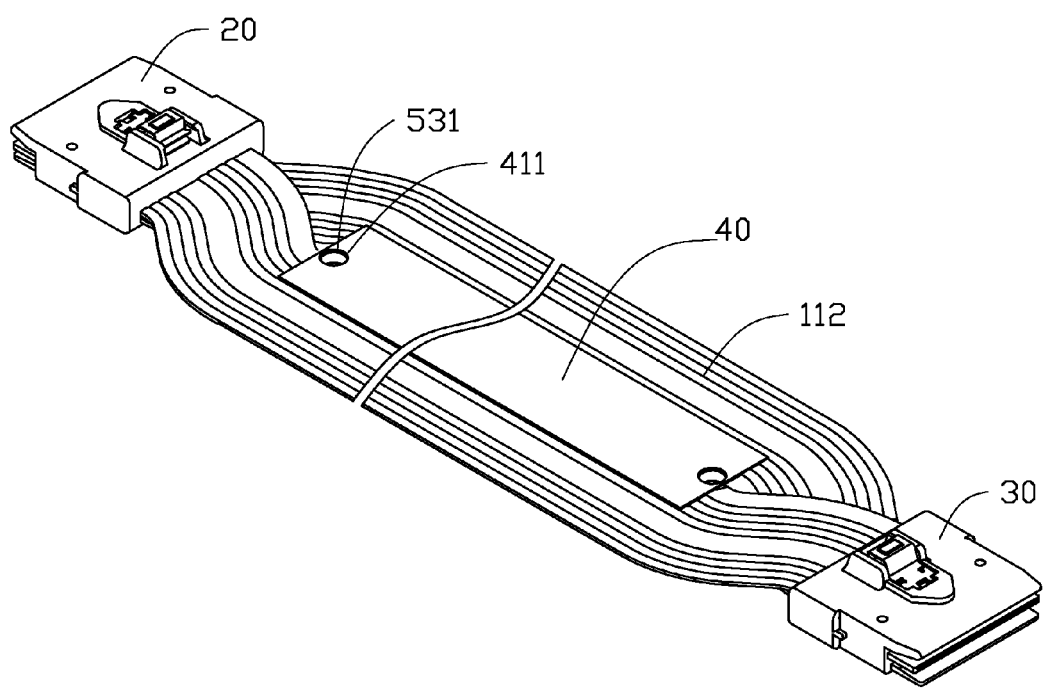
FIG. 3 is similar to FIG. 2, but shows the connecting member in a second state.

Referring to FIGS. 2 and 3, the first resilient component 40 is located on the top surface 112 of the cable body 11. The securing holes 411, 431 are aligned with the two through holes 15 of the cable body 11. The second resilient component 50 is located on the bottom surface 113 of the cable body 11. The two positioning posts 511, 531 are in turn extended through the two through holes 15, for respectively being engaged in the securing holes 411, 431. Thus, the cable body 11 is sandwiched between the first and second resilient components 40, 50.

The first and second resilient components 40, 50 are elastically deformable between a first state and a second state. In the first state, the first and second resilient components 40, 50 are contracted, thereby shortening a distance between the first and second connectors 20, 30, that are connected to the cable body 11, to take up slack of the cable body 11, when the first and second connectors 20, 30 are near each other. In the second state, the first and second resilient components 40, 50 are elastically extended when the cable body 11 is pulled, to allow an increase in the distance between the first and second connectors 20, 30.

In use, the first and second connectors 20, 30 connected to the cable body 11 are connected to two electronic components, such as a motherboard and a storage device, in an electronic device enclosure (not shown). To test if the electronic component works, one of the two electronic components is removed from the electronic device enclosure, so the electronic component can be tested. At this time, the second connector 30 connected to the one of the two electronic components is pulled away from the first connector 20, to be in the second state. When the one of the two electronic components is placed back in the electronic device enclosure, the first and second resilient components 40, 50 contract, urging the cable body 11 to contract as well. Thus, the distance between the first and second connector 20, 30 is capable of shorting as needed, and keep the cable body 11 orderly between the two electronic components and not waste space in the electronic device.

In addition, the distance between the first and second connector 20, 30 is capable of shorting and increasing, with the first and second resilient components 40, 50 that sandwich the cable body 11. Therefore, the cable body 11 is not easily damaged when the first and second connectors 20, 30 are connected to the electronic components. The cable 10 can be placed orderly between the electronic components in an enclosure (not shown).

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A connecting member comprising:
   a cable configured for transmitting signals, the cable comprising a first connector and a second connector configured to be electrically connected to two electronic components;
   a first resilient component located on a top surface of the cable; and
   a second resilient component located on a bottom surface of the cable, configured for being secured to the first resilient component; wherein
   the cable is sandwiched between the first resilient component and the second resilient component; and the first and second resilient components are elastically deformable between a first state, in which the first and second resilient components are contracted, and a second state, in which the first and second resilient components are elastically extended.

2. The connecting member of claim 1, wherein the cable further comprises a cable body, and the first and second connectors are electronically connected to the cable body.

3. The connecting member of claim 2, wherein the width of the first resilient component or the second resilient component is less than, or equal to the width of the cable body.

4. The connecting member of claim 2, wherein the cable body comprises a top surface and a bottom surface, the first resilient component is located on the top surface, and the second resilient component is located on the bottom surface.

5. The connecting member of claim 2, wherein a securing hole is defined in the first resilient component, a positioning post is located on the second resilient component.

6. The connecting member of claim 5, wherein a through hole is defined in the cable body, and the positioning post extends through the through hole and into the securing hole.

7. The connecting member of claim 1, wherein the first and second resilient components are wave shaped in the first state.

8. The connecting member of claim 1, wherein the first and second resilient components are two extendable elastic pieces.

9. A connecting member comprising:
   a cable configured for transmitting signals, the cable comprising a cable body, the cable body comprising a top surface and a bottom surface;
   a first resilient component located on the top surface, and a securing hole defined in the first resilient component; and
   a second resilient component located on the bottom surface, and a positioning post located on the second resilient component, wherein the positioning post is inserted into the securing hole, and the cable is sandwiched between the first resilient component and the second resilient component.

10. The connecting member of claim 9, wherein the first and second resilient components are wave shaped when are contracted.

11. The connecting member of claim 9, wherein the width of the first resilient component or the second resilient component is less than, or equal to the width of the cable body.

12. The connecting member of claim 9, wherein the first and second resilient components are two extendable elastic pieces.

13. The connecting member of claim 9, wherein a through hole is defined in the cable body, and the positioning post extends through the through hole and into the securing hole.

14. The connecting member of claim 9, wherein the cable further comprises a first connector and a second connector configured to be electrically connected to two electronic components, and the first and second connectors are electronically connected to two ends of the cable body.

* * * * *